United States Patent
Yang

(10) Patent No.: US 12,028,835 B2
(45) Date of Patent: Jul. 2, 2024

(54) METHODS, APPARATUSES, USER EQUIPMENT AND BASE STATIONS FOR DETERMINING SIDELINK RESOURCE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 358 days.

(21) Appl. No.: 17/421,112

(22) PCT Filed: Jan. 10, 2019

(86) PCT No.: PCT/CN2019/071213
§ 371 (c)(1),
(2) Date: Jul. 7, 2021

(87) PCT Pub. No.: WO2020/142995
PCT Pub. Date: Jul. 16, 2020

(65) Prior Publication Data
US 2022/0159620 A1    May 19, 2022

(51) Int. Cl.
*H04W 4/00*    (2018.01)
*H04W 72/02*    (2009.01)
(Continued)

(52) U.S. Cl.
CPC ....... *H04W 72/02* (2013.01); *H04W 72/1263* (2013.01); *H04W 72/542* (2023.01); *H04W 76/14* (2018.02)

(58) Field of Classification Search
CPC ... H04W 28/04; H04W 72/04; H04W 72/042; H04W 88/08; H04W 28/08;
(Continued)

(56) References Cited

U.S. PATENT DOCUMENTS 10,225,874 B2    3/2019  Zeng et al.
10,575,304 B2 *  2/2020  Faurie ............... H04W 72/0453
(Continued)

FOREIGN PATENT DOCUMENTS

CA    3016652 C  *  6/2022  ............ H04W 24/00
CN    104754748 A    7/2015
(Continued)

OTHER PUBLICATIONS

European Patent Office, Extended European Search Report Issued in Application No. 19908446.8, Dec. 21, 2021, Germany, 14 pages.
(Continued)

*Primary Examiner* — Phuongchau Ba Nguyen
(74) *Attorney, Agent, or Firm* — Syncoda LLC; Feng Ma

(57) ABSTRACT

A method for determining sidelink resource includes: determining sidelink resource configuration information, where the sidelink resource configuration information is used to instruct the user equipment to determine a target sidelink resource according to quality of service (QoS) information of to-be-transmitted sidelink data; determining a target resource determination mode according to the QoS information of the to-be-transmitted sidelink data and the sidelink resource configuration information; and determining the target sidelink resource for conveying the to-be-transmitted sidelink data in the target resource determination mode.

17 Claims, 8 Drawing Sheets

(51) Int. Cl.
*H04W 72/1263* (2023.01)
*H04W 72/542* (2023.01)
*H04W 76/14* (2018.01)

(58) Field of Classification Search
CPC ... H04W 28/084; H04W 36/22; H04W 72/12; H04W 72/02; H04W 72/1263; H04W 72/542; H04W 76/14; H04W 72/543; H04W 72/20; H04L 5/0007
See application file for complete search history.

(56) References Cited

U.S. PATENT DOCUMENTS

| | | | | |
|---|---|---|---|---|
| 11,490,405 | B2* | 11/2022 | Zhou | H04W 4/70 |
| 11,706,763 | B2* | 7/2023 | Chen | H04W 72/20 709/226 |
| 2016/0323869 | A1* | 11/2016 | Xu | H04W 72/0473 |
| 2017/0006653 | A1* | 1/2017 | Zeng | H04W 72/23 |
| 2017/0257876 | A1 | 9/2017 | Loehr et al. | |
| 2020/0112982 | A1* | 4/2020 | Li | H04W 76/14 |
| 2020/0314928 | A1* | 10/2020 | Kang | H04W 76/14 |
| 2023/0284184 | A1* | 9/2023 | Loehr | H04W 72/02 370/329 |

FOREIGN PATENT DOCUMENTS

| | | |
|---|---|---|
| CN | 104811892 A | 7/2015 |
| CN | 104936292 A | 9/2015 |
| CN | 107580340 A | 1/2018 |
| CN | 108696935 A | 10/2018 |
| CN | 108702761 A | 10/2018 |
| CN | 109076561 A | 12/2018 |
| EP | 3273634 A1 | 1/2018 |
| WO | 2010100657 A2 | 9/2010 |
| WO | 2016148543 A1 | 9/2016 |
| WO | 2016169122 A1 | 10/2016 |
| WO | WO-2016191943 A1 * | 12/2016 ............ H04W 72/04 |
| WO | 2017133644 A1 | 8/2017 |
| WO | 2018022225 A1 | 2/2018 |

OTHER PUBLICATIONS

ISA State Intellectual Property Office of the People's Republic of China, Written Opinion of the International Searching Authority Issued in Application No. PCT/CN2019/071213, Sep. 27, 2019, WIPO, 9 pages.

State Intellectual Property Office of the People's Republic of China, Office Action and Search Report Issued in Application No. 2019800002173, Sep. 5, 2022, 14 pages,(Submitted with Machine Translation).

Indian Patent Office, Office Action Issued in Application No. 202147035057, Mar. 8, 2022, 7 pages.

State Intellectual Property Office of the People's Republic of China, Office Action and Search Report Issued in Application No. 2019800002173, Apr. 19, 2023, 18 pages.(Submitted with Machine Translation).

ITL,"Considerations on resource pool in NR Sidelink for V2X", 3GPP TSG-RAN WG2 Meeting #103bis, R2-1815510, Chengdu, China, Oct. 8-12, 2018,3 pages.

ISA State Intellectual Property Office of the People's Republic of China, International Search Report Issued in Application No. PCT/CN2019/071213, Sep. 27, 2019, WIPO, 4 pages.

Wang Jun, "Cross-layer wireless resource management design based on MIMO-OFDM system", Telecom Express, Issue 03, Mar. 10, 2008.

InterDigital Communications, "MAC Layer Impact of Supporting Different Services", 3GPP TSG-RAN WG2 #96, R2-168468, Reno, Nevada Nov. 14-18, 2016.

Intellectual property India, Hearing Notice in Reference of Application No. 202147035057, Sep. 11, 2023.

Intellectual property India, Hearing Notice in Reference of Application No. 202147035057, Oct. 4, 2023.

European Patent Office, Office Action Issued in Application No. 19908446.8, Mar. 13, 2024, Netherlands, 14 pages.

* cited by examiner

METHODS, APPARATUSES, USER EQUIPMENT AND BASE STATIONS FOR DETERMINING SIDELINK RESOURCE

TECHNICAL FIELD

CROSS-REFERENCE TO RELATED APPLICATION

This application is a national stage of International Application No. PCT/CN2019/071213 filed on Jan. 10, 2019, the disclosure of which is hereby incorporated by reference in its entirety.

BACKGROUND

With development of wireless communication technology, mobile communication networks have gradually evolved to 5G (fifth generation mobile communication technology) New Radio (5G NR for short) systems. In the 5G NR systems, sidelink technology has also been introduced, that is, direct communication between user equipment (UE for short) is performed by using radio resources. Similar to the sidelink technology in 4G Long Term Evolution (4G LTE for short) systems, the sidelink technology in the 5G NR systems can be applied to application scenarios such as Vehicle-to-Everything (V2X for short).

In LTE systems, when one UE communicates with another UE by using the sidelink technology, it may determine radio transmission resources in a network dynamic scheduling mode, or by autonomous selection from a resource pool broadcast by a network (also named as network broadcast mode). In the LTE systems, the UE can select only one of resource configuration modes to determine sidelink transmission resources. With the network broadcast mode, if UE is in an idle state, it is not required to enter a connected state, which can save signaling overhead of the NR; but the network needs to reserve resources for a sidelink resource pool in the broadcast, and resource utilization rate is low. With the network dynamic scheduling mode, resources can be configured according to actual sidelink service requirements, and the resource utilization rate is relatively high; but the UE in the idle state is required to enter the connected state, which increases the signaling overhead.

The 5G NR systems place higher demands on flexible resource configuration and efficient resource utilization. Therefore, how to determine NR sidelink resources is to be studied.

SUMMARY

In order to overcome the problems in the related art, the embodiments of the present disclosure provide methods, apparatuses, user equipment and base stations for determining sidelink resource. The system can reasonably balance a relationship between resource utilization and signaling overhead.

According to a first aspect of the embodiments of the present disclosure, there is provided a method of determining sidelink resource applied to user equipment, including:

determining sidelink resource configuration information, where the sidelink resource configuration information is used to instruct the user equipment to determine a target sidelink resource according to quality of service (QoS) information of to-be-transmitted sidelink data;

determining a target resource determination mode according to the QoS information of the to-be-transmitted sidelink data and the sidelink resource configuration information; and determining the target sidelink resource for conveying the to-be-transmitted sidelink data in the target resource determination mode.

In some examples, determining the sidelink resource configuration information includes:

acquiring sidelink resource configuration information broadcast by a base station.

In some examples, the sidelink resource configuration information includes: a correspondence between a preset resource pool and first preset QoS information; and determining the target resource determination mode according to the QoS information of the to-be-transmitted sidelink data and the sidelink resource configuration information, includes:

determining whether the first preset QoS information includes the QoS information of the to-be-transmitted sidelink data; and in response to the first preset QoS information including the QoS information of the to-be-transmitted sidelink data, determining a first resource determination mode as the target resource determination mode, where the first resource determination mode involves determining the target sidelink resource from the preset resource pool.

In some examples, determining the target resource determination mode according to the QoS information of the to-be-transmitted sidelink data and the sidelink resource configuration information, further includes:

in response to the first preset QoS information not including the QoS information of the to-be-transmitted sidelink data, determining a second resource determination mode as the target resource determination mode, where the second resource determination mode involves requesting a network to dynamically schedule of sidelink resources.

In some examples, the sidelink resource configuration information further includes: first preset indication information for informing the user equipment of acquiring the target sidelink resource in the second resource determination mode in response to the first preset QoS information not including the QoS information of the to-be-transmitted sidelink data; and determining the second resource determination mode as the target resource determination mode, includes:

determining the second resource determination mode as the target resource determination mode according to the first preset indication information.

In some examples, the sidelink resource configuration information includes: a correspondence between second preset QoS information and a second resource determination mode, where the second resource determination mode involves requesting a network to dynamically schedule sidelink resources; and determining the target resource determination mode according to the QoS information of the to-be-transmitted sidelink data and the sidelink resource configuration information, includes:

determining whether the second preset QoS information includes the QoS information of the to-be-transmitted sidelink data; and in response to the second preset QoS information including the QoS information of the to-be-transmitted sidelink data, determining the second resource determination mode as the target resource determination mode.

In some examples, the sidelink resource configuration information includes: a correspondence between third preset QoS information, and a second resource determination mode and a preset radio access type; the second resource determination mode involves requesting a network to dynamically schedule sidelink resources; and determining the target resource determination mode according to the QoS information of the to-be-transmitted sidelink data and the sidelink resource configuration information, includes:

determining whether the third preset QoS information includes the QoS information of the to-be-transmitted sidelink data;

in response to the third preset QoS information including the QoS information of the to-be-transmitted sidelink data, determining whether the user equipment supports a target radio access technology type corresponding to the QoS information of the to-be-transmitted sidelink data; and in response to the user equipment supporting the target radio access technology type, determining the second resource determination mode as the target resource determination mode.

In some examples, the preset radio access technology type includes at least one of: NR sidelink access technology or Long Term Evolution (LTE) sidelink access technology.

In some examples, the QoS information includes: sidelink data package priority indication information, or channel quality indication information.

In some examples, in response to the target resource determination mode being the first resource determination mode, determining the target sidelink resource for conveying the to-be-transmitted sidelink data in the target resource determination mode, includes:

determining the target sidelink resource from a target preset resource pool corresponding to the QoS information of the to-be-transmitted sidelink data.

In some examples, in response to the target resource determination mode being configured to request a network to dynamically schedule sidelink resources, determining the target sidelink resource for conveying the to-be-transmitted sidelink data in the target resource determination mode, includes:

determining a current connection state of the user equipment;

in response to the user equipment being currently in a connected state, sending sidelink resource request information to the base station;

in response to the user equipment being currently in an idle state, requesting the base station to establish a network connection; and after determining that the user equipment enters the connected state, sending the sidelink resource request information to the base station;

where the sidelink resource request information is used for requesting the base station to dynamically schedule sidelink resources for the user equipment.

In some examples, before determining the target resource determination mode according to the QoS information of the to-be-transmitted sidelink data and the sidelink resource configuration information, the method further includes:

sending sidelink assistance information to the base station, so that the base station schedules sidelink resources for the user equipment by referring to the sidelink assistance information.

According to a second aspect of the embodiments of the present disclosure, there is provided a method of determining sidelink resource applied to a base station, including:

determining sidelink resource configuration information, where the sidelink resource configuration information is used to instruct user equipment to determine a target sidelink resource according to quality of service (QoS) information of to-be-transmitted sidelink data; and broadcasting the sidelink resource configuration information to the user equipment in a serving cell, so that the user equipment determines a target sidelink resource for conveying the to-be-transmitted sidelink data according to QoS information of the to-be-transmitted sidelink data and the sidelink resource configuration information.

In some examples, the sidelink resource configuration information includes at least one of:

a correspondence between a preset resource pool and first preset QoS information;

a correspondence between second preset QoS information and a second resource determination mode, where the second resource determination mode involves requesting a network to dynamically schedule sidelink resources; or a correspondence between third preset QoS information, and the second resource determination mode and a preset radio access type.

In some examples, the method further includes:

receiving sidelink assistance information sent by the user equipment; and determining a resource scheduling mode for the user equipment with reference to the sidelink assistance information.

According to a third aspect of the embodiments of the present disclosure, there is provided an apparatus for determining sidelink resource provided in user equipment, including:

a configuration information determination module, configured to determine sidelink resource configuration information, where the sidelink resource configuration information is used to instruct the user equipment to determine a target sidelink resource according to quality of service (QoS) information of to-be-transmitted sidelink data;

a target mode determination module, configured to determine a target resource determination mode according to the QoS information of the to-be-transmitted sidelink data and the sidelink resource configuration information; and a resource determination module, configured to determine the target sidelink resource for conveying the to-be-transmitted sidelink data in the target resource determination mode.

In some examples, the configuration information determination module is configured to acquire sidelink resource configuration information broadcast by a base station.

In some examples, the sidelink resource configuration information includes: a correspondence between a preset resource pool and first preset QoS information; and the target mode determination module includes:

a first match sub-module, configured to determine whether the first preset QoS information includes the QoS information of the to-be-transmitted sidelink data; and a first determination sub-module, configured to, in response to the first preset QoS information including the QoS information of the to-be-transmitted sidelink data, determine a first resource determination mode as the target resource determination mode, where the first resource determination mode involves determining the target sidelink resource from the preset resource pool.

In some examples, the target mode determination module further includes:

a second determination sub-module, configured to, in response to the first preset QoS information not including the QoS information of the to-be-transmitted sidelink data, determine a second resource determination mode as the target resource determination mode, where the second resource determination mode involves requesting a network to dynamically schedule sidelink resources.

In some examples, the sidelink resource configuration information further includes: first preset indication information for informing the user equipment of acquiring the target sidelink resource in the second resource determination mode in response to the first preset QoS information not including the QoS information of the to-be-transmitted sidelink data; and the second determination sub-module is configured to determine the second resource determination mode as the target resource determination mode according to the first preset indication information.

In some examples, the sidelink resource configuration information includes: a correspondence between second preset QoS information and a second resource determination mode, where the second resource determination mode involves requesting a network to dynamically schedule sidelink resources; and the target mode determination module includes:

a second match sub-module, configured to determine whether the second preset QoS information includes the QoS information of the to-be-transmitted sidelink data; and a third determination sub-module, configured to, in response to the second preset QoS information including the QoS information of the to-be-transmitted sidelink data, determine the second resource determination mode as the target resource determination mode.

In some examples, the sidelink resource configuration information includes: a correspondence between third preset QoS information, and a second resource determination mode and a preset radio access type; the second resource determination mode involves requesting a network to dynamically schedule sidelink resources; and the target mode determination module includes:

a third match sub-module, configured to determine whether the third preset QoS information includes the QoS information of the to-be-transmitted sidelink data;

a fourth match sub-module, configured to, in response to the third preset QoS information including the QoS information of the to-be-transmitted sidelink data, determine whether the user equipment supports a target radio access technology type corresponding to the QoS information of the to-be-transmitted sidelink data; and a fourth determination sub-module, configured to, in response to the user equipment supporting the target radio access technology type, determine the second resource determination mode as the target resource determination mode.

In some examples, the preset radio access technology type includes at least one of: NR sidelink access technology or Long Term Evolution (LTE) sidelink access technology.

In some examples, the QoS information includes: sidelink data package priority indication information, or channel quality indication information.

In some examples, in response to the target resource determination mode being the first resource determination mode, the resource determination module is configured to: determine the target sidelink resource from a target preset resource pool corresponding to the QoS information of the to-be-transmitted sidelink data.

In some examples, in response to the target resource determination mode being configured to request a network to dynamically schedule sidelink resources, the resource determination module includes:

a state determination sub-module, configured to determine a current connection state of the user equipment;

an access request sub-module, configured to, in response to the user equipment being currently in an idle state, request the base station to establish a network connection; and a scheduling request sub-module, configured to, in response to the user equipment being currently in a connected state, send sidelink resource request information to the base station;

where the sidelink resource request information is used for requesting the base station to dynamically schedule sidelink resources for the user equipment.

In some examples, the apparatus further includes:

an assistance information sending module, configured to send sending sidelink assistance information to the base station, so that the base station schedules sidelink resources for the user equipment by referring to the sidelink assistance information.

According to a fourth aspect of the embodiments of the present disclosure, there is provided an apparatus for determining sidelink resource provided in a base station, including:

a configuration information determination module, configured to determine sidelink resource configuration information, where the sidelink resource configuration information is used to instruct user equipment to determine a target sidelink resource according to quality of service (QoS) information of to-be-transmitted sidelink data; and a broadcasting module, configured to broadcast the sidelink resource configuration information to the user equipment in a serving cell, so that the user equipment determines a target sidelink resource for conveying the to-be-transmitted sidelink data according to QoS information of the to-be-transmitted sidelink data and the sidelink resource configuration information.

In some examples, the sidelink resource configuration information includes at least one of:

a correspondence between a preset resource pool and first preset QoS information;

a correspondence between second preset QoS information and a second resource determination mode, where the second resource determination mode involves requesting a network to dynamically schedule sidelink resources; or a correspondence between third preset QoS information, and the second resource determination mode and a preset radio access type.

In some examples, the apparatus further includes:

an assistance information reception module, configured to receive sidelink assistance information sent by the user equipment; and a scheduling mode determination module, configured to determine a resource scheduling mode for the user equipment with reference to the sidelink assistance information.

According to a fifth aspect of the embodiments of the present disclosure, there is provided a non-transitory computer readable storage medium with computer instructions stored thereon, where when the computer instructions are executed by a processor, steps according to any method of the first aspect are implemented.

According to a sixth aspect of the embodiments of the present disclosure, there is provided a non-transitory computer readable storage medium with computer instructions stored thereon, where when the computer instructions are executed by a processor, steps according to any method of the second aspect are implemented.

According to a seventh aspect of the embodiments of the present disclosure, there is provided user equipment, including:

a processor; and memory storing instructions executable by the processor, where the processor is configured to:

determine sidelink resource configuration information, where the sidelink resource configuration information is used to instruct the user equipment to determine a target sidelink resource according to quality of service (QoS) information of to-be-transmitted sidelink data;

determine a target resource determination mode according to the QoS information of the to-be-transmitted sidelink data and the sidelink resource configuration information; and determine the target sidelink resource for conveying the to-be-transmitted sidelink data in the target resource determination mode. According to an eighth aspect of the embodiments of the present disclosure, there is provided a base station, including:

a processor; and memory storing instructions executable by the processor, where the processor is configured to:

determine sidelink resource configuration information, where the sidelink resource configuration information is used to instruct user equipment to determine a target sidelink resource according to quality of service (QoS) information of to-be-transmitted sidelink data; and broadcast the sidelink resource configuration information to the user equipment in a serving cell, so that the user equipment determines a target sidelink resource for conveying the to-be-transmitted sidelink data according to QoS information of the to-be-transmitted sidelink data and the sidelink resource configuration information.

The embodiments of the present disclosure provide a method for determining sidelink resources. UE can perform a match for sidelink resource configuration information of the system according to quality of service information (QoS information) of to-be-sent sidelink data. The sidelink resource configuration information indicates a correspondence between QoS information of sidelink data and a preset resource determination mode; UE can determine a target resource determination mode suitable for current to-be-sent sidelink data, thereby determining a target resource for conveying to-be-sent sidelink data in the target resource determination mode. The target resource can be acquired in an appropriate resource determination mode determined in the sidelink resource determination mode according to a system planning, so that the system can reasonably balance a relationship between resource utilization and signaling overhead, improve effective utilization of system resources and reduce system signaling overhead.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Figure 1:
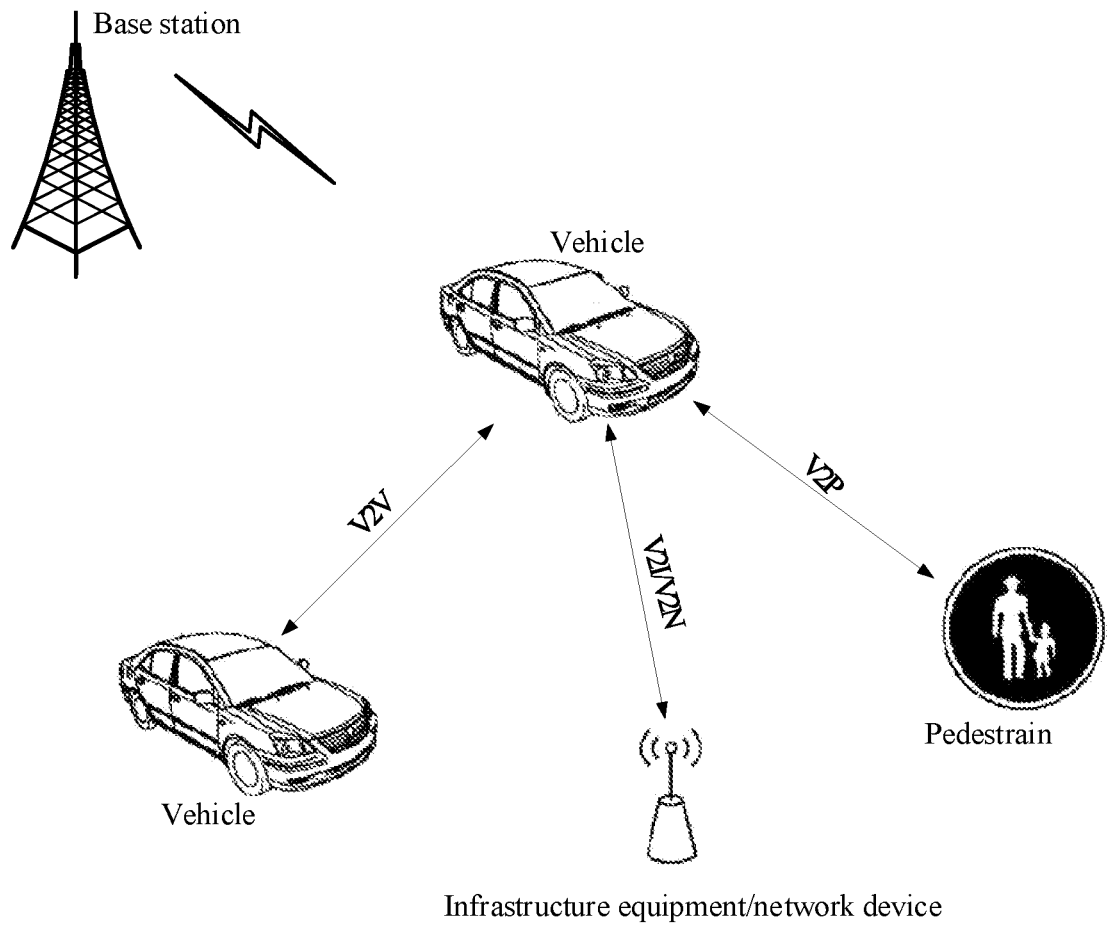
FIG. 1 illustrates application scenarios for determining sidelink resource according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are only for the purpose of describing specific examples and are not intended to limit the present disclosure. The singular forms "a", "said" and "the" used in the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms "first", "second", "third", etc. may be used in the present disclosure to describe various information, the information should not be limited to these terms. These terms are only used to distinguish information of the same type from each other. For example, without departing from the scope of the present disclosure, the first information may also be referred to as second information, and similarly, the second information may also be referred to as first information. Depending on the context, the word "if" as used herein may be interpreted as "on the condition that" or "when" or "in response to determining".

The subjects for performing each process or step involved in the present disclosure include: user equipment (UE for short) and base stations that support sidelink technology in 5G NR systems. The UE can be a user terminal, a user node, a mobile terminal, a tablet computer, or on-board equipment, etc. The base stations may include a base station, a sub-base station, etc., provided with a large-scale antenna array. In a specific implementation, the base station and the UE are independent of each other, and meanwhile connected to each other to jointly implement technical solutions provided by the present disclosure.

The present disclosure may be applied to an application scenario of Vehicle to Everything (V2X for short). Refer to FIG. 1 showing the scenario application according to an example of the present disclosure. Specifically, V2X may include: vehicle to vehicle communication (V2V for short), Vehicle to Infrastructure communication (V2I for short), Vehicle to Nomadic Device communication (V2N for short) representing communication between a vehicle and a Nomadic Device of a driver, Vehicle to Pedestrian (V2P for short) communication representing communication between a vehicle and a Nomadic Device of a pedestrian, and so on. In the application scenario, UE supporting sidelink technology may be equipment such as on-board equipment, infrastructure equipment, and a mobile terminal of a pedestrian. In the sidelink technology, the UE can transmit information to other UE by using the sidelink transmission resources configured by a system.

Before preparing to send information to surrounding UE by using the sidelink technology, the UE is to determine sidelink resources first.

Thus, the present disclosure provides a method for determining sidelink resources applied to the UE.

Figure 2:
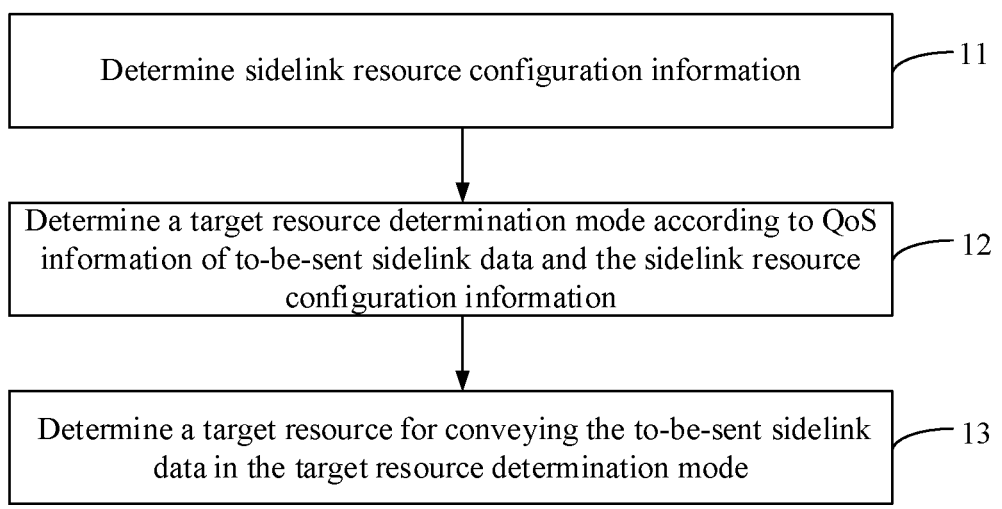
FIG. 2 is a flowchart illustrating a method of determining sidelink resource according to an example of the present disclosure.

Referring to FIG. 2 showing a flowchart of a method for determining sidelink resources according to an example, the method may include the following steps.

At step 11, sidelink resource configuration information is determined, where the sidelink resource configuration information is used to instruct the UE to determine a target sidelink resource according to quality of service (QoS for short) information of to-be-transmitted sidelink data.

The sidelink resource configuration information in the present disclosure is mainly used to instruct the UE to use which mode to determine the target sidelink resource according to the QoS information of the to-be-transmitted sidelink data.

The to-be-transmitted sidelink data includes: to-be-sent sidelink data or to-be-received sidelink data. The QoS information of the to-be-transmitted sidelink data indicates requirements for transmission reliability, transmission delay, transmission rate, transmission distance and other transmission performance parameters of the to-be-transmitted sidelink data.

The target sidelink resource refers to a radio resource for conveying the to-be-transmitted sidelink data.

Taking the UE being UE1 as an example, in the present disclosure, UE1 can determine the sidelink resource configuration information in at least two modes as follows.

in mode 1, if sidelink resource configuration information broadcast by a current cell has been stored by UE1, UE1 directly determines the sidelink resource configuration information according to the stored information.

in mode 2, if the sidelink resource configuration information of the current cell is not pre-stored in UE1, UE1 can receive the sidelink resource configuration information broadcast by the cell.

Similar to LTE sidelink technology, in 5G NR technology, a base station supporting the sidelink technology can specify periodically broadcasting sidelink resource configuration information to UE in a serving cell according to a protocol.

The sidelink resource configuration information may be carried in preset system information. For example, if LTE sidelink protocol is still used in 5G NR sidelink technology, the sidelink resource configuration information may be carried in system information SIB18, 19, 21, and 26 and broadcast to the UE in the cell. In response to receiving the system information, UE in an idle state (IDLE) in a current cell can parse the sidelink resource configuration information from the system information.

At step 12, a target resource determination mode is determined according to QoS information of to-be-sent sidelink data and the sidelink resource configuration information.

In the present disclosure, in response to determining the to-be-sent sidelink data, the UE can learn QoS information of the to-be-sent sidelink data according to related art; then the target resource determination mode is determined according to the QoS information of the to-be-sent sidelink data and the sidelink resource configuration information.

The QoS information may include: service data priority indication information, or channel quality indication information.

In an embodiment, the service data priority indication information may be Prose Per Packet Priority (PPPP for short). The channel quality indication information may be 5QI information that quantifies channel quality according to a preset rule. For example, the 5QI information is similar to CQI in LTE system, and can be quantified as a preset number of 5QI levels according to system specifications.

The target resource determination mode is used to instruct the UE to use which mode to determine the target sidelink resource.

In the present disclosure, a system can specify that in NR sidelink technology, UE can further determine the target sidelink resource in following two sidelink resource determination modes:

in a first resource determination mode, UE selects a target sidelink resource from a resource pool pre-configured by the system; and in a second resource determination mode, UE in a connected state requests a base station to dynamically configure a target sidelink resource for it.

In the present disclosure, UE may determine a mode from the resource determination modes according to a preset strategy as the target resource determination mode.

According to different sidelink resource configuration information, UE can implement the step 12 by using at least one of the following methods.

In a first method, the sidelink resource configuration information includes: a correspondence between a preset resource pool and first preset QoS information.

Similar to the LTE sidelink technology, in the NR sidelink technology, a system can further manage time-frequency resources used in sidelink communication by using a resource pool. A resource pool is a collection of periodic time-frequency resources on a given system bandwidth.

In the present disclosure, the system can only specify that when QoS information of to-be-sent sidelink data of UE satisfies preset QoS information, UE in an idle state is allowed to select a target sidelink resource from a preset resource pool, thereby avoiding that the system occupies too many resources to incur a low resource utilization due to configuring too many resource pools.

For example, the system may specify that when a service priority of to-be-sent sidelink data is higher, UE in an idle state may select a target sidelink resource from a preset resource pool to transmit the to-be-sent sidelink data.

Figure 3:
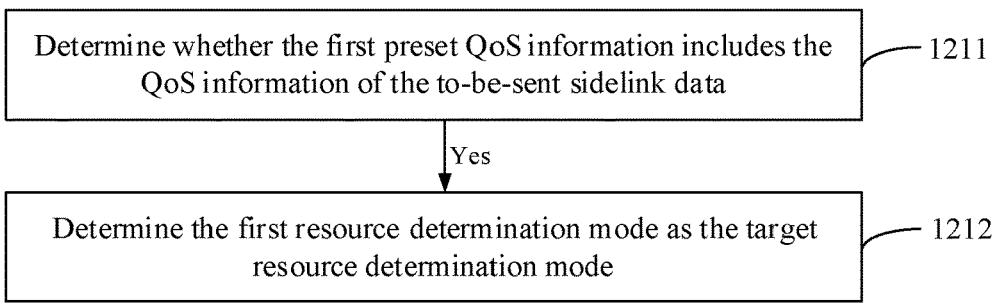
FIG. 3 is a flowchart illustrating another method of determining sidelink resource according to an example of the present disclosure.

Referring to FIG. 3 showing a flowchart of another method for determining sidelink resources according to an example, the step 12 may include following steps.

At step 1211, it is determined whether the first preset QoS information includes the QoS information of the to-be-sent sidelink data.

In the present disclosure, in response to determining the QoS information of the to-be-sent sidelink data, UE1 can determine whether the first preset QoS information includes the QoS information of the to-be-sent sidelink data; if the first preset QoS information includes the QoS information of the to-be-sent sidelink data, following step 1212 is performed.

If the first preset QoS information does not include the QoS information of the to-be-sent sidelink data, in one case, it means that UE1 cannot determine a sidelink resource according to resource configuration information of a current base station. UE1 can abandon sidelink transmission or switch to another cell to determine the target sidelink resource; in another case, UE1 can enter a connected state, and request a base station to dynamically schedule a sidelink resource for it according to system specification information, which will be described in detail later in conjunction with detailed description.

At step 1212, if the first preset QoS information includes QoS information of the to-be-sent sidelink data, the first resource determination mode is determined as the target resource determination mode, and the first resource determination mode involves determining the target resource from the preset resource pool.

In the embodiments of the present disclosure, the system may specify that a base station can configure different preset resource pools for different application scenarios, for example, the base station can configure different preset resource pools for V2V, V2I, V2N, and V2P.

For a single application scenario, a base station can configure a correspondence between a preset resource pool and preset QOS information, the correspondence including one-to-one correspondence, one-to-many correspondence, many-to-one correspondence, many-to-many correspondence, and so on.

Taking the one-to-one approach as an example, assuming that for a V2N application scenario, the system specifies that there are two preset resource pools A and B, respectively corresponding to first preset QoS information QoS a and QoS b; the sidelink resource configuration information can be shown in Table 1:

TABLE 1

| Resource pool identifier | First preset QoS information |
|---|---|
| Resource pool A | QoS a |
| Resource pool B | QoS b |

Assuming that UE1 in an idle state determines that QoS information of current to-be-sent sidelink data is QoS a, UE1 can determine to select a target sidelink resource from a target preset resource pool, namely the preset resource pool A; that is, UE1 determines the first resource determination mode as the target resource determination mode.

Figure 4:
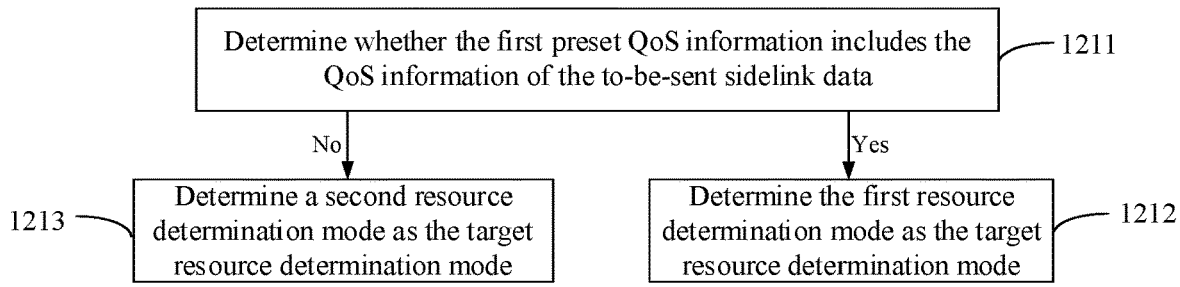
FIG. 4 is a flowchart illustrating another method of determining sidelink resource according to an example of the present disclosure.

Referring to FIG. 4 showing a flowchart of another method for determining sidelink resources according to an example, on the basis of the embodiment shown in FIG. 3, the step 12 may further include:

at step 1213, if the first preset QoS information does not include the QoS information of the to-be-sent sidelink data, a second resource determination mode is determined as the target resource determination mode. The second resource determination mode involves requesting a network to dynamically schedule sidelink resources.

In an embodiment of the present disclosure, if the UE determines that the first preset QoS information does not include the QoS information of the to-be-sent sidelink data, in one case, the UE can acquire the target sidelink resource in requesting for network dynamic scheduling mode, i.e. the second resource determination mode, according to the system specification information.

In another embodiment of the present disclosure, sidelink resource configuration information broadcast by a base station includes: the correspondence between the preset resource pool and the first preset QoS information, and may further include: first preset indication information for informing UE that when the first preset QoS information does not include the QoS information of the to-be-sent sidelink data, the second resource determination mode is used to request the base station to dynamically schedule sidelink resources for the UE.

The first preset indication information can be represented by a preset bit value in preset system information. For example, when the system specifies that the sidelink resource configuration information is carried in SIB18, the system may further specify that the first preset indication information is carried by a bit with serial number N in SIB18. When the bit with sequence number N is set to 1, it means that the first preset indication information is carried, which indicates that the base station supports following capabilities: when the first preset QoS information does not include the QoS information of the to-be-sent sidelink data, the UE may request the base station to dynamically schedule sidelink resources for it in the second resource determination mode.

In contrast, when the bit with sequence number N is set to 0, it means that the sidelink resource configuration information broadcast by the base station does not include the first preset indication information, which indicates that the base station does not support the above capabilities. In this case, the UE can acquire the target sidelink resource by using other methods such as switching to a cell served by another base station.

The step 1213 includes: if the first preset QoS information does not include the QoS information of the to-be-sent sidelink data, the second resource determination mode is determined as the target resource determination mode according to the first preset indication information.

In a second method, the sidelink resource configuration information includes: a correspondence between second preset QoS information and a second resource determination mode, and the second resource determination mode involves requesting a network to dynamically schedule sidelink resources.

Figure 5:
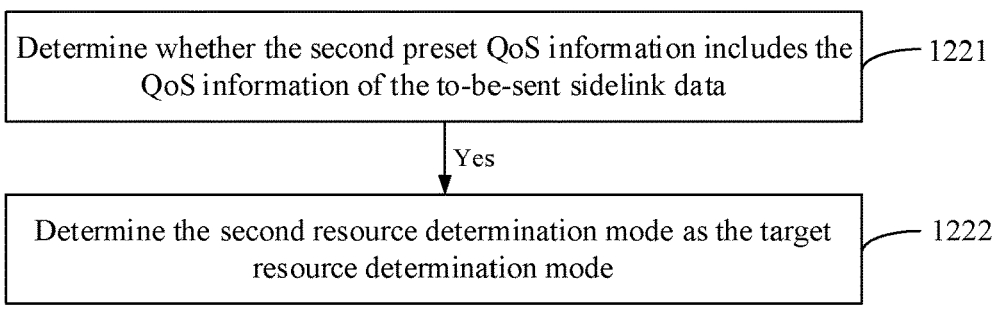
FIG. 5 is a flowchart illustrating another method of determining sidelink resource according to an example of the present disclosure.

Referring to FIG. 5 showing a flowchart of another method for determining sidelink resources according to an example, the step 12 may include following steps.

At step 1221, it is determined whether the second preset QoS information includes the QoS information of the to-be-sent sidelink data.

In the embodiments of the present disclosure, the sidelink resource configuration information broadcast by the base station may include: a correspondence between second preset QoS information and a second resource determination mode.

In an embodiment of the present disclosure, the sidelink resource configuration information may be expressed as a preset sidelink QoS list.

Still as the above example, after UE1 determines the QoS information of the to-be-sent sidelink data, or in response to UE1 determining that the first preset QoS information does not include the QoS information of the to-be-sent sidelink data, the preset sidelink QoS list can be traversed to determine whether the second preset QoS information includes the QoS information of the to-be-sent sidelink data; if the second preset QoS information includes the QoS information of the to-be-sent sidelink data, following step 1222 is performed; if the second preset QoS information does not include the QoS information of the to-be-sent sidelink data, the target sidelink resource can be determined in other modes or sidelink transmission in a current cell can be abandoned according to a relevant specification.

At step 1222, if the second preset QoS information includes the QoS information of the to-be-sent sidelink data, the second resource determination mode is determined as the target resource determination mode.

For example, it is assumed that content indicated by the sidelink resource configuration information may be as shown in Table 2:

TABLE 2

| Second preset QoS information | Sidelink resource determination mode |
|---|---|
| QoS c | Request a network to |
| QoS d | dynamically schedule |

Assuming that QoS information of to-be-sent sidelink data of UE1 is QoS c; it can be known from the Table 2 that UE1 can determine the second resource determination mode, namely, the requesting a network to dynamically schedule mode, as the target resource determination mode.

In the embodiments of the present disclosure, a base station can notify that UE in a cell meets conditions of a network to dynamically scheduling resource through the sidelink resource configuration information, so that the UE enters the connected state when the preset conditions are met according to the QoS information of the to-be-sent sidelink data. In response to a communication connection with the base station being established, the UE requests the base station to dynamically configurate sidelink resources for it.

In a third method, the sidelink resource configuration information may include: a correspondence between third preset QoS information, and a second resource determination mode and a preset radio access type; as described above, the second resource determination mode involves requesting a network to dynamically schedule sidelink resources.

The third preset QoS information may be the same as or different from the second preset QoS information.

Figure 6:
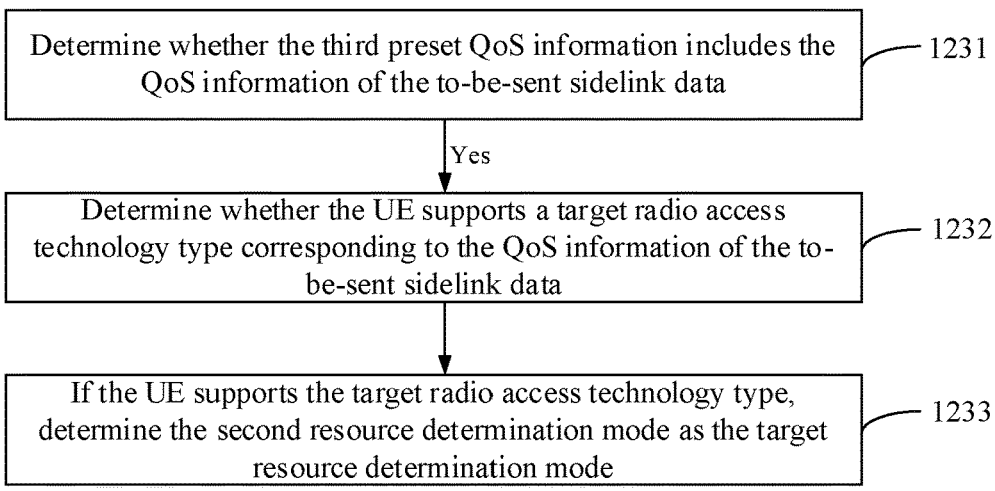
FIG. 6 is a flowchart illustrating another method of determining sidelink resource according to an example of the present disclosure.

Referring to FIG. 6 showing a flowchart of another method for determining sidelink resources according to an example, the step 12 may include following steps.

At step 1231, it is determined whether the third preset QoS information includes the QoS information of the to-be-sent sidelink data;

Similar to the step 1221, after UE1 determines the QoS information of the to-be-sent sidelink data, or in response to UE1 determining that the first preset QoS information does not include the QoS information of the to-be-sent sidelink data, UE1 may determine whether the third preset QoS information includes the QoS information of the to-be-sent sidelink data;

If the third preset QoS information includes the QoS information of the to-be-sent sidelink data, following step 1232 is performed; if the third preset QoS information does not include the QoS information of the to-be-sent sidelink data, the target sidelink resource can be determined in other modes or sidelink transmission in a current cell is abandoned according to a relevant specification.

At step 1232, if the third preset QoS information includes the QoS information of the to-be-sent sidelink data, it is determined whether the UE supports a target radio access technology type corresponding to the QoS information of the to-be-sent sidelink data.

The target radio access technology type may include: NR sidelink access technology, and/or LTE sidelink access technology.

Still taking UE1 as an example, if UE1 determines that the third preset QoS information includes the QoS information of the to-be-sent sidelink data, it is to further determine whether the sidelink radio access technology type it supports matches a radio access technology type required by the system. If the sidelink radio access technology type it supports matches the radio access technology type required by the system, following step 1233 is performed; otherwise, the target sidelink resource can be determined in other modes or sidelink transmission in a current cell is abandoned according to a relevant specification.

At step 1233, if the UE supports the target radio access technology type, the second resource determination mode is determined as the target resource determination mode.

In the embodiments of the present disclosure, for UE1, when the determined QoS information of the to-be-sent sidelink data and the supported sidelink radio access technology type both satisfy requirements of the sidelink resource configuration information, the second resource determination mode may be determined as the target resource determination mode.

For example, it is assumed that content indicated by the sidelink resource configuration information may be as shown in Table 3:

TABLE 3

| Third preset QoS information | Sidelink resource determination mode | Radio access technology type |
|---|---|---|
| QoS e | Request a network to dynamically schedule | NR sidelink access technology |
| QoS f | | LTE sidelink access technology |

Assuming that the QoS information of the to-be-sent sidelink data of UE1 is QoS e; according to the Table 3, UE1 is to further determine whether the sidelink radio access technology required by the to-be-sent sidelink data is the target radio access technology type corresponding to QoS e, namely NR Sidelink access technology; if the sidelink radio access technology required by the to-be-sent sidelink data is the target radio access technology type corresponding to QoS e, the second resource determination mode can be determined as the target resource determination mode.

In an embodiment of the present disclosure, an APP layer of UE may, when generating a data packet of the to-be-sent sidelink data, specify a sidelink radio access technology type required for the to-be-sent sidelink data.

In the embodiments of the present disclosure, the sidelink radio access technology type may be LTE sidelink access technology, or NR sidelink access technology, or both are applicable.

That is, the data packet of the to-be-sent sidelink data obtained by a physical layer of UE1 carries sidelink radio access technology indication information. Based on the sidelink radio access technology indication information, UE1 can determine which sidelink radio access technology is to be used for the to-be-sent sidelink data.

In the embodiments of the present disclosure, a base station not only specifies QoS information of sidelink data for which a second resource determination mode can be used, but also further specifies a sidelink radio access technology type, so that when determining that QoS information of to-be-sent sidelink data belongs to the third preset QoS information and the supported sidelink radio access technology type also satisfy system requirements, UE determines the second resource determination mode as the target resource determination mode.

At step 13, a target resource for conveying the to-be-sent sidelink data is determined in the target resource determination mode.

Corresponding to different target resource determination modes, the step 13 may also include two cases.

In case 1, the target resource determination mode determined by the UE is the first resource determination mode.

Correspondingly, the step 13 may include: determining the target resource from a target preset resource pool corresponding to the QoS information of the to-be-sent sidelink data.

As shown in the Table 1, when QoS information of to-be-sent sidelink data of UE1 is QoS a, UE1 may select a target resource from resources configured by a target preset resource pool A according to related art.

In case 2, the target resource determination mode determined by the UE is the second resource determination mode.

Figure 7:
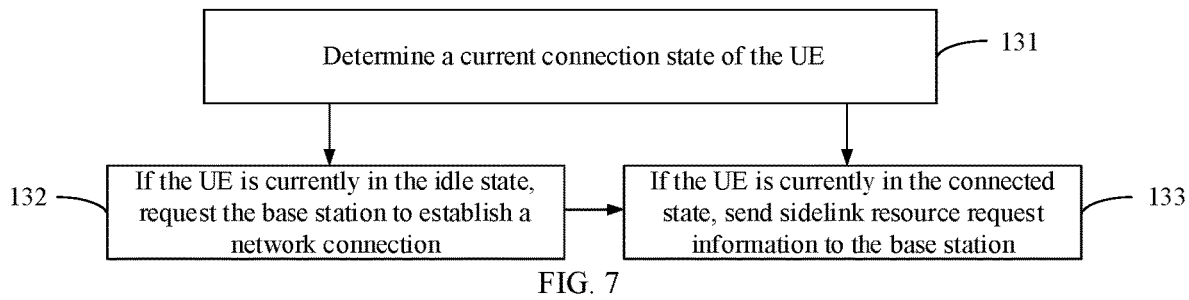
FIG. 7 is a flowchart illustrating another method of determining sidelink resource according to an example of the present disclosure.

Referring to FIG. 7 showing a flowchart of another method for determining sidelink resources according to an example, the step 13 may include following steps.

At step 131, a current connection state of the UE is determined.

A network connection state of UE in a cell may at least include: an idle state (IDLE) and a connected state (CONNECTED); only in the connected state, the UE can send data to a base station through a physical channel.

At step 132, if the UE is currently in the idle state, the UE requests the base station to establish a network connection.

At step 133, if the UE is currently in the connected state, sidelink resource request information is sent to the base station.

The sidelink resource request information is used to request the base station to dynamically schedule sidelink resources for the UE.

As in the above example, if UE1 is currently in an idle state, it is first to request the base station to establish a network connection, such as sending a random access request to the base station. In response to the base station responding to the random access request and allowing access to a cell network, that is, UE1 enters the connected state, UE1 sends the sidelink resource request information to the base station, requesting the base station to schedule sidelink resources for it.

The embodiments of the present disclosure provide a method for determining sidelink resources. UE can perform a match for sidelink resource configuration information of the system according to quality of service information (QoS information) of to-be-sent sidelink data. The sidelink resource configuration information indicates a correspondence between QoS information of sidelink data and a preset resource determination mode; UE can determine a target resource determination mode suitable for current to-be-sent sidelink data, thereby determining a target resource for conveying to-be-sent sidelink data in the target resource determination mode. The target resource can be acquired in an appropriate resource determination mode determined in the sidelink resource determination mode according to a system planning, so that the system can reasonably balance a relationship between resource utilization and signaling overhead, improve effective utilization of system resources and reduce system signaling overhead.

Figure 8:
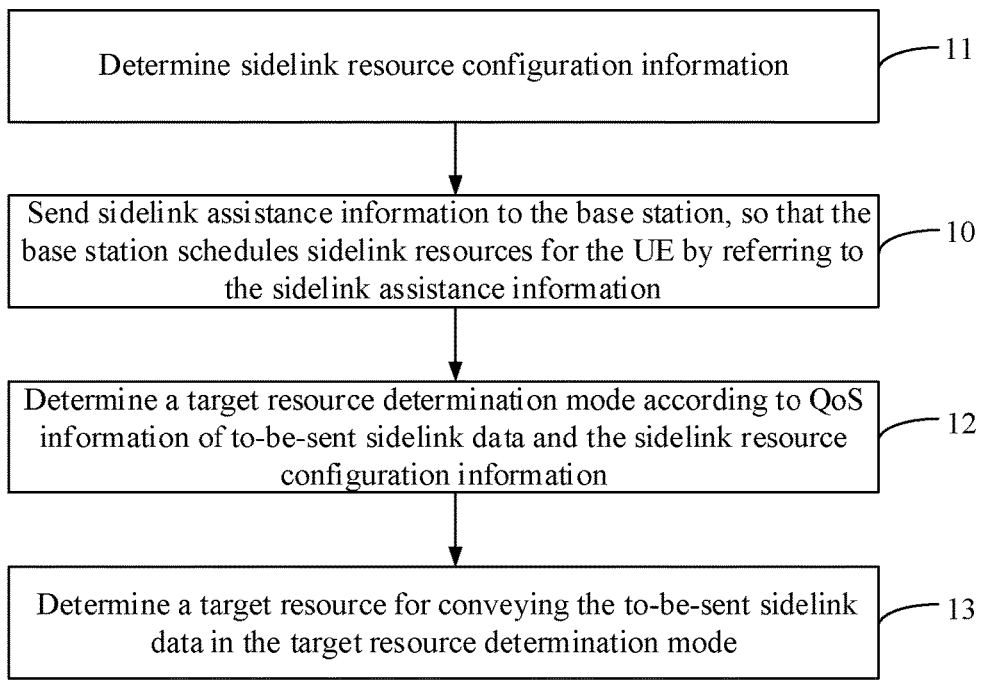
FIG. 8 is a flowchart illustrating another method of determining sidelink resource according to an example of the present disclosure.

Referring to FIG. 8 showing a flowchart of another method for determining sidelink resources according to an example, following the step 11, the method may further include:

at step 10, sidelink assistance information is sent to the base station, so that the base station schedules sidelink resources for the UE by referring to the sidelink assistance information.

In an embodiment of the present disclosure, in response to receiving sidelink resource configuration information broadcast by a base station, UE1 can further send its own sidelink assistance information to the base station; the sidelink assistance information of UE1 is used to inform the base station of information of UE1 using sidelink technology, such as destination ID, whether to perform sidelink transmission currently, etc.

In an embodiment of the present disclosure, UE1 may send the sidelink assistance information to the base station through a sidelink UE Information message.

Correspondingly, in response to acquiring the sidelink assistance information of UE1, the base station can determine whether it is possible to schedule sidelink resources for UE1, and in response to it being possible to schedule sidelink resources for UE1, the base station can determine whether to configure sidelink resources and other information for UE1 currently to improve accuracy of dynamic scheduling of sidelink resources of the base station for the UE, thereby improving effective utilization of system resources.

Correspondingly, the present disclosure further provides a method for determining sidelink resources applied to a base station.

Figure 9:
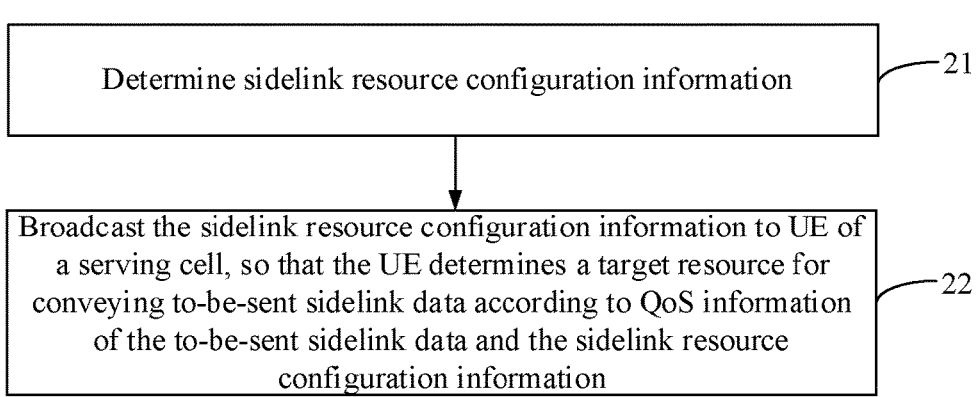
FIG. 9 is a flowchart illustrating a method of determining sidelink resource according to an example of the present disclosure.

Referring to FIG. 9 showing a flowchart of a method for determining sidelink resources according to an example, the method may include following steps.

At step 21, sidelink resource configuration information is determined, where the sidelink resource configuration information is used to instruct UE to determine a target sidelink resource according to quality of service (QoS) information of the to-be-transmitted sidelink data.

As described above, in the present disclosure, the base station can determine different sidelink resource configuration information for different application scenarios. For a single application scenario such as a V2V scenario, the base station can configure a correspondence between a preset resource pool and preset QoS information, and/or a correspondence between preset QoS information and the second resource determination mode; and generate the sidelink resource configuration information according to the correspondence between the preset QoS information and the preset resource determination mode.

At step 22, the sidelink resource configuration information is broadcast to UE of a serving cell, so that the UE determines a target resource for conveying to-be-sent sidelink data according to QoS information of the to-be-sent sidelink data and the sidelink resource configuration information.

In the present disclosure, the sidelink resource configuration information may include at least one of the following:

a correspondence between a preset resource pool and first preset QoS information;

a correspondence between second preset QoS information and a second resource determination mode, where the second resource determination mode involves requesting a network to dynamically schedule sidelink resources; and a correspondence between a third preset QoS information, and the second resource determination mode and a preset radio access type.

Correspondingly, in response to receiving the sidelink resource configuration information, UE may determine a target resource for conveying the to-be-sent sidelink data according to at least one of the embodiments shown in FIG. 3 to FIG. 7.

Figure 10:
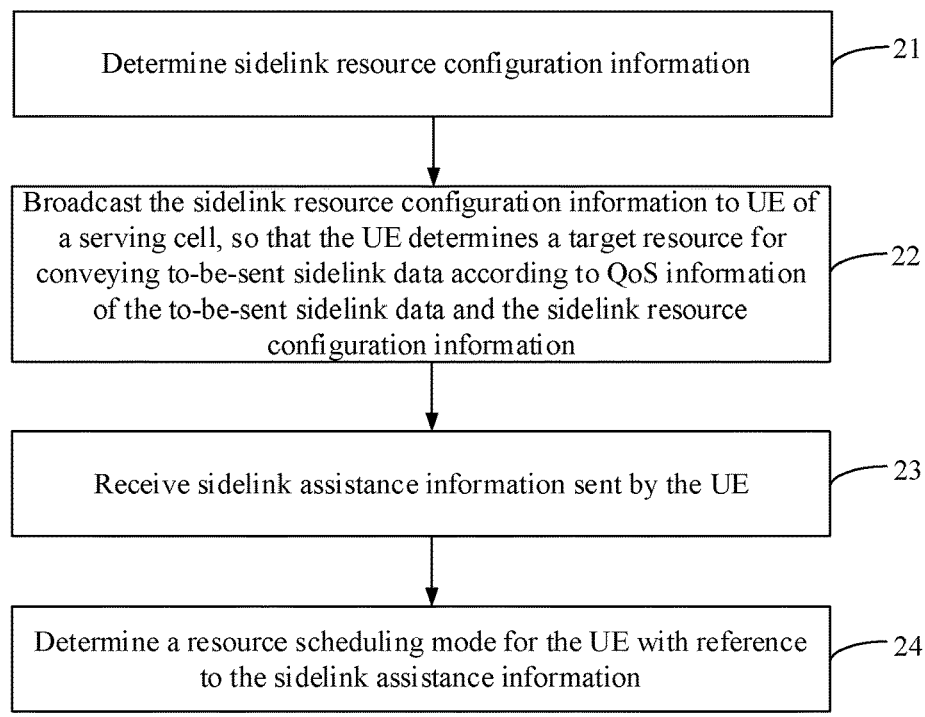
FIG. 10 is a flowchart illustrating another method of determining sidelink resource according to an example of the present disclosure.

Referring to FIG. 10 showing a flowchart of another method for determining sidelink resources according to an example, the method may further include following steps.

At step 23, sidelink assistance information sent by the UE is received.

Corresponding to the step 10, still taking UE1 as an example, the base station can receive sidelink assistance information sent by UE1. The sidelink assistance information of UE1 is used to inform the base station of information of UE1 using sidelink technology, such as destination ID, whether to perform sidelink transmission currently, etc At step 24, a resource scheduling mode for the UE is determined with reference to the sidelink assistance information.

In response to acquiring the sidelink assistance information of UE1, the base station can determine whether it is possible to schedule sidelink resources for UE1, and in response to it being possible to schedule sidelink resources for UE1, the base station can determine whether to configure sidelink resources and other information for UE1 currently.

For example, when a current base station determines that it is not possible to dynamically schedule sidelink resources for UE1 according to the sidelink assistance information of UE1, it can perform mobility management on UE1 and instruct UE1 to switch to a serving cell of another target base station that can dynamically schedule sidelink resources for UE1.

Alternatively, if the base station determines, according to the sidelink assistance information of UE1, that UE1 is not to perform sidelink transmission at present, the base station can perform resource scheduling in consideration of UE1 being a general UE, and temporarily does not configure sidelink resources for UE1. When UE1 requests the base station to schedule sidelink resources for UE1, the base station then configures sidelink resources for UE1. Such way can avoid that the base station informs sidelink resource configuration information by using signaling even when UE1 is not to perform sidelink transmission, thereby reducing system signaling overhead.

The above-mentioned method embodiments are presented as a series of actions for simplicity of description, but those skilled in the art should know that the present disclosure is not limited by the sequence of actions described, because some steps may be performed in other sequences or simultaneously according to the present disclosure.

Secondly, those skilled in the art should also know that the embodiments described in the specification are optional embodiments, and involved actions and modules are not necessarily required by the present disclosure.

Corresponding to the above-mentioned method embodiments, the present disclosure also provides apparatus embodiments and corresponding terminal embodiments.

Correspondingly, the present disclosure provides an apparatus for determining sidelink resource, which may be provided in UE.

Figure 11:
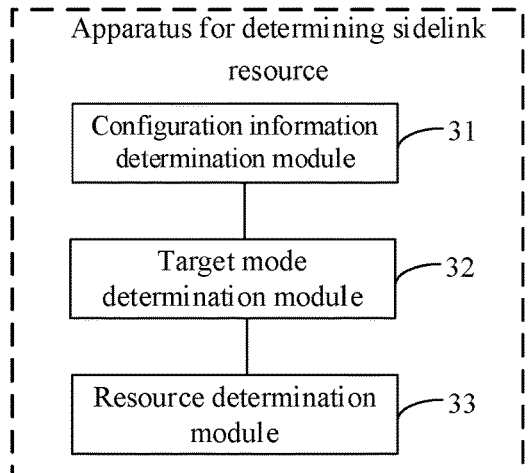
FIG. 11 is a block diagram illustrating an apparatus for determining sidelink resource according to an example of the present disclosure.

Referring to FIG. 11 showing a block diagram illustrating an apparatus for determining sidelink resource according to an example of the present disclosure, the apparatus may include:

a configuration information determination module 31, configured to determine sidelink resource configuration information, where the sidelink resource configuration information is used to instruct the user equipment to determine a target sidelink resource according to quality of service (QoS) information of to-be-transmitted sidelink data;

in an apparatus embodiment of the present disclosure, the QoS information may include: sidelink data package priority indication information, or channel quality indication information.

a target mode determination module 32, configured to determine a target resource determination mode according to the QoS information of the to-be-transmitted sidelink data and the sidelink resource configuration information; and a resource determination module 33, configured to determine the target sidelink resource for conveying the to-be-transmitted sidelink data in the target resource determination mode.

In another apparatus embodiment of the present disclosure, the configuration information determination module 31 may be configured to acquire sidelink resource configuration information broadcast by a base station.

In an apparatus embodiment of the present disclosure, the sidelink resource configuration information determined by the configuration information determination module 31 may include: a correspondence between a preset resource pool and first preset QoS information.

Figure 12:
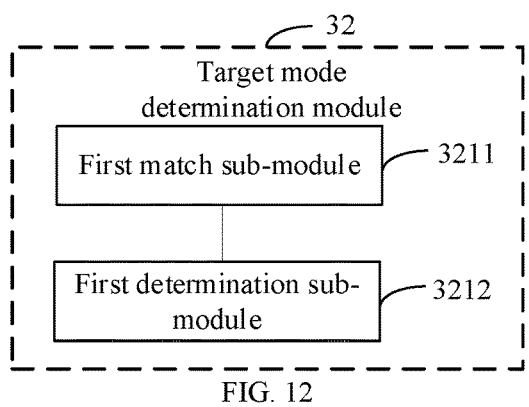
FIG. 12 is a block diagram illustrating another apparatus for determining sidelink resource according to an example of the present disclosure.

Correspondingly, referring to FIG. 12 showing a block diagram illustrating another apparatus for determining sidelink resource according to an example of the present disclosure, on the basis of the apparatus embodiment shown in FIG. 11, the target mode determination module 32 may include:

a first match sub-module 3211, configured to determine whether the first preset QoS information includes the QoS information of the to-be-transmitted sidelink data; and a first determination sub-module 3212, configured to, in response to the first preset QoS information including the QoS information of the to-be-transmitted sidelink data, determine a first resource determination mode as the target resource determination mode, where the first resource determination mode involves determining the target sidelink resource from the preset resource pool.

Figure 13:
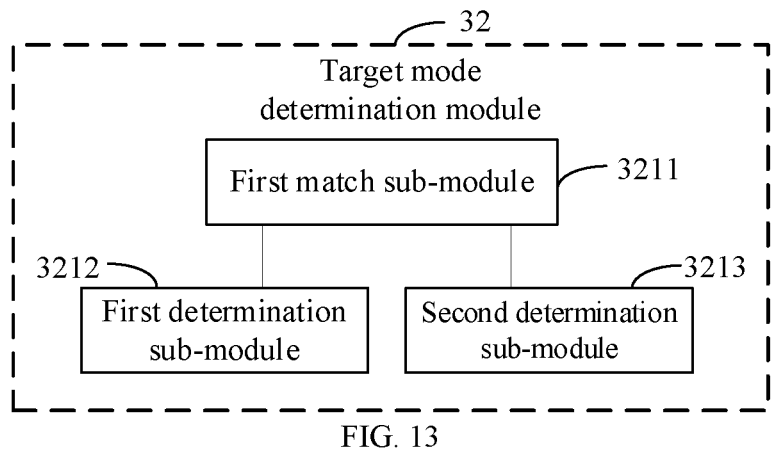
FIG. 13 is a block diagram illustrating another apparatus for determining sidelink resource according to an example of the present disclosure.

Referring to FIG. 13 showing a block diagram illustrating another apparatus for determining sidelink resource according to an example of the present disclosure, on the basis of the apparatus embodiment shown in FIG. 12, the target mode determination module 32 may further include:

a second determination sub-module 3213, configured to, in response to the first preset QoS information not including the QoS information of the to-be-transmitted sidelink data, determine a second resource determination mode as the target resource determination mode, where the second resource determination mode involves requesting a network to dynamically schedule sidelink resources.

In another apparatus embodiment of the present disclosure, the sidelink resource configuration information determined by the configuration information determination module 31 may further include: first preset indication information for informing the user equipment of acquiring the target sidelink resource in the second resource determination mode in response to the first preset QoS information not including the QoS information of the to-be-transmitted sidelink data.

Correspondingly, the second determination sub-module 3213 may be configured to determine the second resource determination mode as the target resource determination mode according to the first preset indication information.

In another apparatus embodiment of the present disclosure, the sidelink resource configuration information determined by the configuration information determination module 31 may include: a correspondence between second preset QoS information and a second resource determination mode, where the second resource determination mode involves requesting a network to dynamically schedule sidelink resources.

Figure 14:
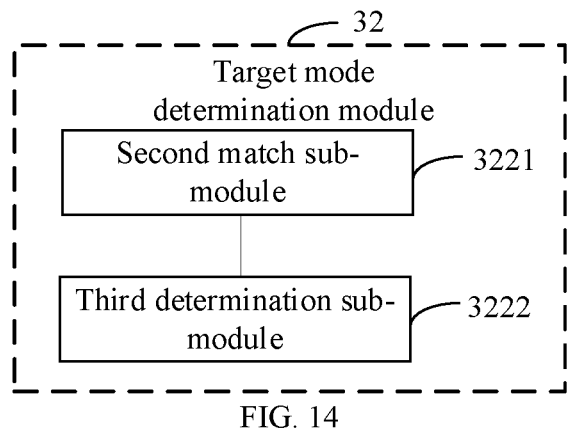
FIG. 14 is a block diagram illustrating another apparatus for determining sidelink resource according to an example of the present disclosure.

Correspondingly, referring to FIG. 14 showing a block diagram illustrating another apparatus for determining sidelink resource according to an example of the present disclosure, on the basis of the apparatus embodiment shown in FIG. 11, the target mode determination module 32 may include:

a second match sub-module 3221, configured to determine whether the second preset QoS information includes the QoS information of the to-be-transmitted sidelink data; and a third determination sub-module 3222, configured to, in response to the second preset QoS information including the QoS information of the to-be-transmitted sidelink data, determine the second resource determination mode as the target resource determination mode.

In another apparatus embodiment of the present disclosure, the sidelink resource configuration information determined by the configuration information determination module 31 may include: a correspondence between third preset QoS information, and a second resource determination mode and a preset radio access type; the second resource determination mode involves requesting a network to dynamically schedule sidelink resources.

In an apparatus embodiment of the present disclosure, the preset radio access technology type may include at least one of: NR sidelink access technology or Long Term Evolution (LTE) sidelink access technology.

Figure 15:
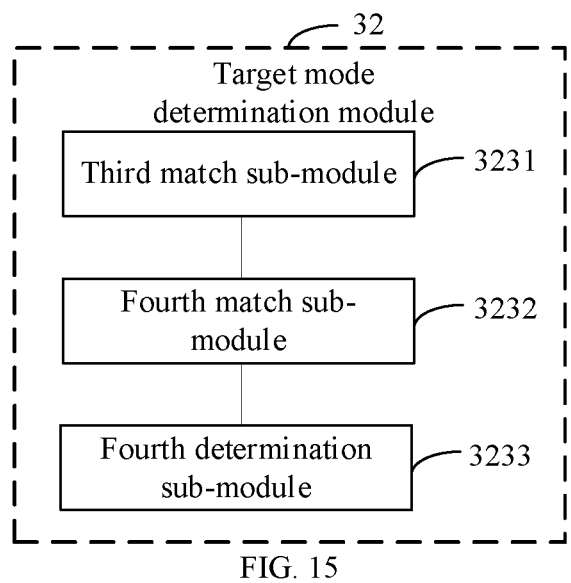
FIG. 15 is a block diagram illustrating another apparatus for determining sidelink resource according to an example of the present disclosure.

Correspondingly, referring to FIG. 15 showing a block diagram illustrating another apparatus for determining sidelink resource according to an example of the present disclosure, on the basis of the apparatus embodiment shown in FIG. 11, the target mode determination module 32 may include:

a third match sub-module 3231, configured to determine whether the third preset QoS information includes the QoS information of the to-be-transmitted sidelink data;

a fourth match sub-module 3232, configured to, in response to the third preset QoS information including the QoS information of the to-be-transmitted sidelink data, determine whether the user equipment supports a target radio access technology type corresponding to the QoS information of the to-be-transmitted sidelink data; and a fourth determination sub-module 3233, configured to, in response to the user equipment supporting the target radio access technology type, determine the second resource determination mode as the target resource determination mode.

In an apparatus embodiment of the present disclosure, in response to the target resource determination mode determined by the target mode determination module 32 being the first resource determination mode, the resource determination module 33 may be configured to: determine the target sidelink resource from a target preset resource pool corresponding to the QoS information of the to-be-transmitted sidelink data.

Figure 16:
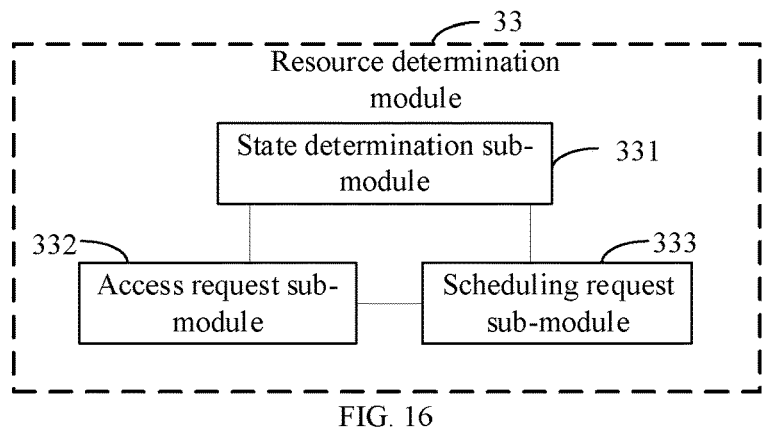
FIG. 16 is a block diagram illustrating another apparatus for determining sidelink resource according to an example of the present disclosure.

In another apparatus embodiment of the present disclosure, in response to the target resource determination mode determined by the target mode determination module 32 being configured to request a network to dynamically schedule sidelink resources;

referring to FIG. 16 showing a block diagram illustrating another apparatus for determining sidelink resource according to an example of the present disclosure, the resource determination module 33 may include:

a state determination sub-module 331, configured to determine a current connection state of the user equipment;

an access request sub-module 332, configured to, in response to the user equipment being currently in an idle state, request the base station to establish a network connection; and a scheduling request sub-module 333, configured to, in response to the user equipment being currently in a connected state, send sidelink resource request information to the base station;

where the sidelink resource request information is used for requesting the base station to dynamically schedule sidelink resources for the user equipment.

Figure 17:
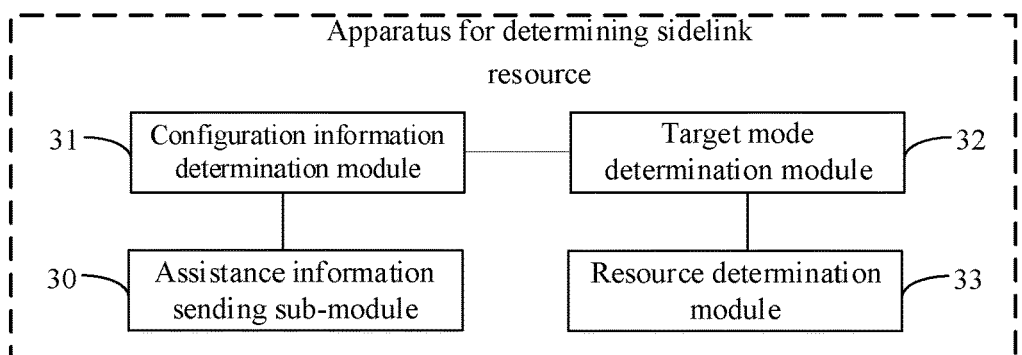
FIG. 17 is a block diagram illustrating another apparatus for determining sidelink resource according to an example of the present disclosure.

Referring to FIG. 17 showing a block diagram illustrating another apparatus for determining sidelink resource according to an example of the present disclosure, on the basis of the apparatus embodiment shown in FIG. 11, the apparatus may further include:

an assistance information sending sub-module 30, configured to send sending sidelink assistance information to the base station, so that the base station schedules sidelink resources for the user equipment by referring to the sidelink assistance information.

Corresponding to the method embodiments for determining the sidelink resource executed by the base station, the present disclosure also provides an apparatus for determining sidelink resource, which may be provided in a base station.

Figure 18:
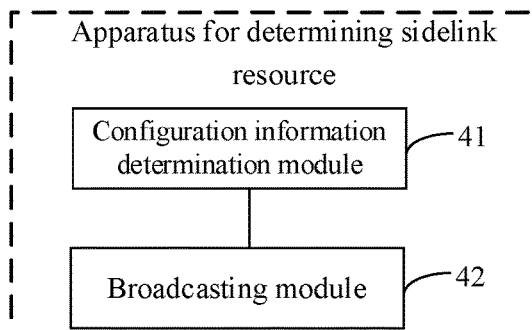
FIG. 18 is a block diagram illustrating an apparatus for determining sidelink resource according to an example of the present disclosure.

Referring to FIG. 18 showing a block diagram illustrating an apparatus for determining sidelink resource according to an example of the present disclosure, the apparatus may include:

a configuration information determination module 41, configured to determine sidelink resource configuration information, where the sidelink resource configuration information is used to instruct user equipment to determine a target sidelink resource according to quality of service (QoS) information of to-be-transmitted sidelink data;

in the present disclosure, the sidelink resource configuration information may include at least one of:

a correspondence between a preset resource pool and first preset QoS information;

a correspondence between second preset QoS information and a second resource determination mode, where the second resource determination mode involves requesting a network to dynamically schedule sidelink resources; or a correspondence between third preset QoS information, and the second resource determination mode and a preset radio access type.

a broadcasting module 42, configured to broadcast the sidelink resource configuration information to the user equipment in a serving cell, so that the user equipment determines a target sidelink resource for conveying the to-be-transmitted sidelink data according to QoS information of the to-be-transmitted sidelink data and the sidelink resource configuration information.

Figure 19:
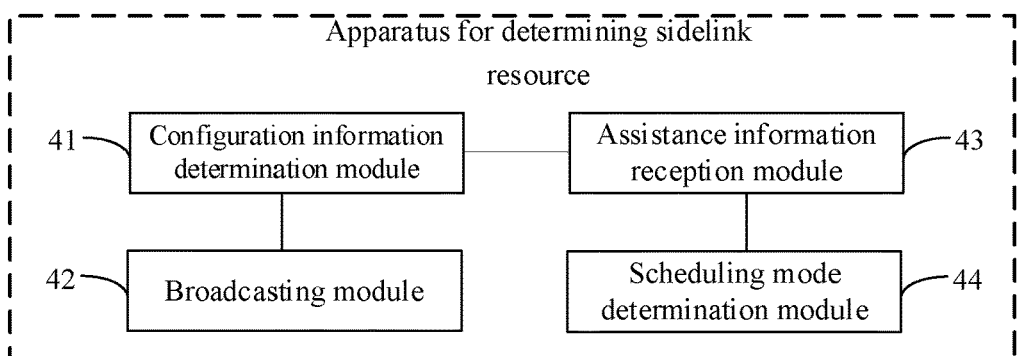
FIG. 19 is a block diagram illustrating another apparatus for determining sidelink resource according to an example of the present disclosure.

Referring to FIG. 19 showing a block diagram illustrating another apparatus for determining sidelink resource according to an example of the present disclosure, on the basis of the apparatus embodiment shown in FIG. 18, the apparatus may further include:

an assistance information reception module 43, configured to receive sidelink assistance information sent by the user equipment; and a scheduling mode determination module 44, configured to determine a resource scheduling mode for the user equipment with reference to the sidelink assistance information.

For the apparatus embodiment, since the apparatus substantially corresponds to the method embodiment, reference may be made to some description of the method embodiment. The apparatus embodiments described above are merely schematic, in which the units described as separate components may or may not be physically separated, and the components displayed as units may or may not be physical units, may be located in one place, or may be distributed to a plurality of network units. Some or all of the modules may be selected according to actual needs to achieve the solution of the present disclosure, which a person of ordinary skill in the art would understand and implement without creative efforts.

Correspondingly, in an aspect, there is provided user equipment, including:

a processor; and memory storing instructions executable by the processor, where the processor is configured to:

determine sidelink resource configuration information, where the sidelink resource configuration information is used to instruct the user equipment to determine a target sidelink resource according to quality of service (QoS) information of to-be-transmitted sidelink data;

determine a target resource determination mode according to the QoS information of the to-be-transmitted sidelink data and the sidelink resource configuration information; and determine the target sidelink resource for conveying the to-be-transmitted sidelink data in the target resource determination mode.

In another aspect, there is provided a base station, including:

a processor; and memory storing instructions executable by the processor, where the processor is configured to:

determine sidelink resource configuration information, where the sidelink resource configuration information is used to instruct user equipment to determine a target sidelink resource according to quality of service (QoS) information of to-be-transmitted sidelink data; and broadcast the sidelink resource configuration information to the user equipment in a serving cell, so that the user equipment determines a target sidelink resource for conveying the to-be-transmitted sidelink data according to QoS information of the to-be-transmitted sidelink data and the sidelink resource configuration information.

Figure 20:
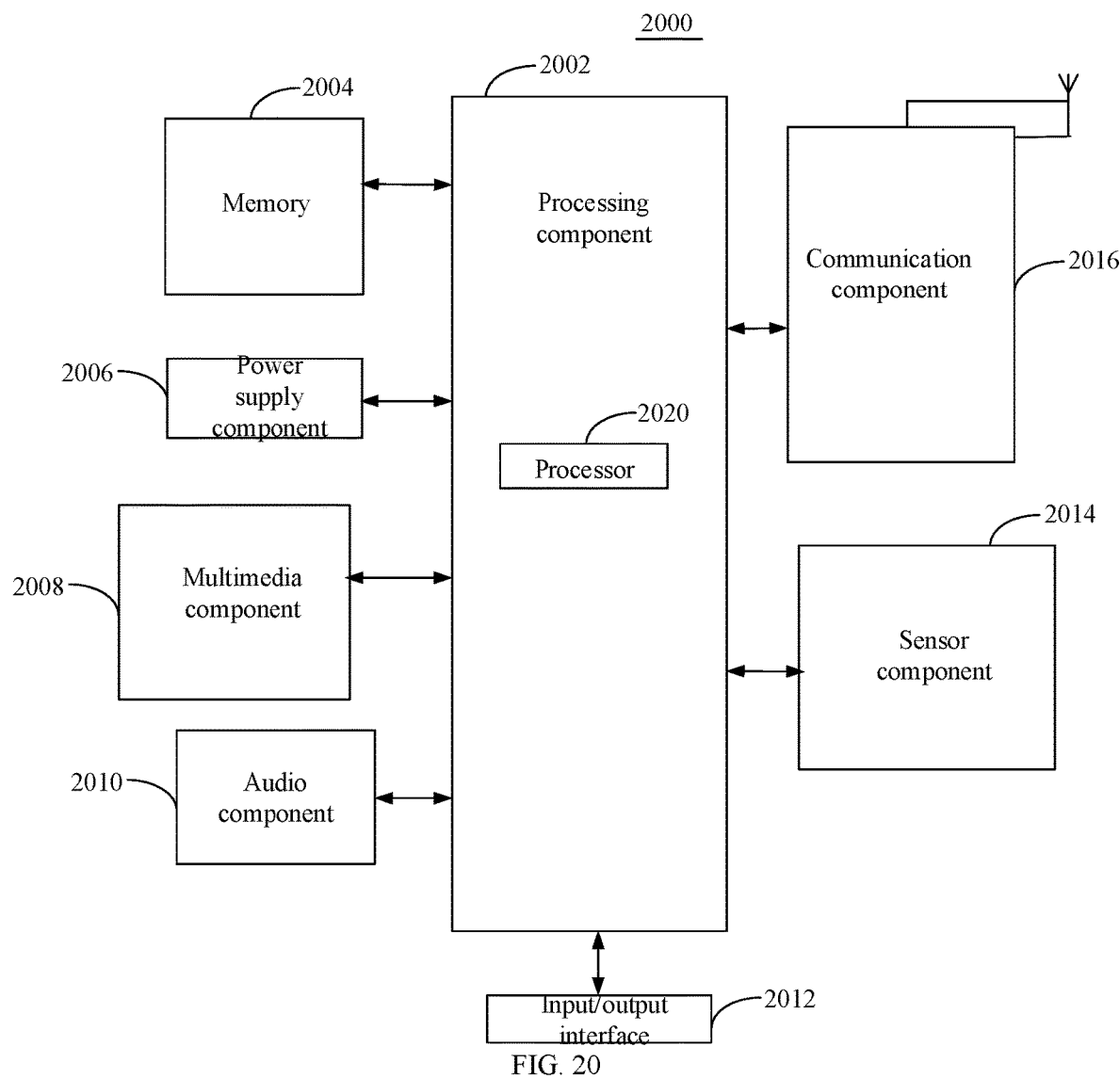
FIG. 20 is a schematic structural diagram illustrating user equipment according to an example of the present disclosure.

FIG. 20 is a schematic structural diagram illustrating user equipment 2000 according to an example of the present disclosure. The user equipment 2000 may be a terminal, including a mobile phone, a computer, a digital broadcast terminal, a message transceiving device, a game console, a tablet device, medical equipment, fitness equipment, a personal digital assistant and a wearable device such as a smart watch, smart glasses, a smart bracelet, smart running shoes, on-board equipment, etc.

As shown in FIG. 20, the user equipment 2000 may include one or more of the following components: a processing component 2002, memory 2004, a power supply component 2006, a multimedia component 2008, an audio component 2010, an input/output (I/O) interface 2012, a sensor component 2014 and a communication component 2016.

The processing component 2002 generally controls overall operations of the user equipment 2000, such as operations associated with display, phone calls, data communications, camera operations, and recording operations. The processing component 2002 may include one or more processors 2020 to execute instructions so as to complete all or part of the steps of the above methods. In addition, the processing component 2002 may include one or more modules to facilitate the interaction between the processing component 2002 and other components. For example, the processing component 2002 may include a multimedia module to facilitate the interaction between the multimedia component 2008 and the processing component 2002.

The memory 2004 is configured to store various types of data to support the operation of the user equipment 2000. Examples of such data include instructions for any application or method operated on the user equipment 2000, contact data, phonebook data, messages, pictures, videos, and so on. The memory 2004 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2006 supplies power for different components of the user equipment 2000. The power supply component 2006 may include a power supply management system, one or more power supplies, and other components associated with generating, managing and distributing power for the user equipment 2000.

The multimedia component 2008 includes a screen providing an output interface between the user equipment 2000 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 2008 may include a front camera and/or a rear camera. The front camera and/or rear camera may receive external multimedia data when the user equipment 2000 is in an operating mode, such as a photographing mode or a video mode. Each of the front camera and the rear camera may be a fixed optical lens system or have focal length and optical zooming capability.

The audio component 2010 is to output and/or input an audio signal. For example, the audio component 2010 includes a microphone (MIC). When the user equipment 2000 is in an operating mode, such as a call mode, a record mode and a voice recognition mode, the microphone is to receive an external audio signal. The received audio signal may be further stored in the memory 2004 or sent via the communication component 2016. In some examples, the audio component 2010 further includes a speaker for outputting an audio signal.

The I/O interface 2012 provides an interface between the processing component 2002 and a peripheral interface module. The peripheral interface module may be a keyboard, a click wheel, buttons, or the like. These buttons may include but not limited to, a home button, a volume button, a start button and a lock button.

The sensor component 2014 includes one or more sensors to provide status assessments of various aspects for the user equipment 2000. For example, the sensor component 2014 may detect the on/off status of the user equipment 2000, and relative positioning of the component, for example, the component is a display and a keypad of the user equipment 2000. The sensor component 2014 may also detect a change in position of the user equipment 2000 or a component of the user equipment 2000, a presence or absence of the contact between a user and the user equipment 2000, an orientation or an acceleration/deceleration of the user equipment 2000, and a change in temperature of the user equipment 2000. The sensor component 2014 may include a proximity sensor to detect the presence of a nearby object without any physical contact. The sensor component 2014 may further include an optical sensor, such as a Complementary Metal-Oxide-Semiconductor (CMOS) or Charged Coupled Device (CCD) image sensor which is used in imaging applications. In some examples, the sensor component 2014 may further include an acceleration sensor, a gyroscope sensor, a magnetic sensor, a pressure sensor, or a temperature sensor.

The communication component 2016 is to facilitate wired or wireless communication between the user equipment 2000 and other devices. The user equipment 2000 may access a wireless network based on a communication standard, such as Wi-Fi, 2G, 3G, 4G LTE or 5G NR systems, or a combination thereof. In an example, the communication component 2016 receives a broadcast signal or broadcast related information from an external broadcast management system via a broadcast channel. In an example, the communication component 2016 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an example, the user equipment 2000 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above method.

In an example, there is further provided a non-transitory computer readable storage medium including instructions, such as the memory 2004 including instructions. The above instructions may be executed by the processor 2020 of the user equipment 2000 to complete the above method of determining sidelink resource according to any of FIG. 2 to FIG. 8. For example, the non-transitory computer readable storage medium may be a Read-Only Memory (ROM), a Random Access Memory (RAM), a CD-ROM, a magnetic tape, a floppy disk, an optical data storage device, and the like.

Figure 21:
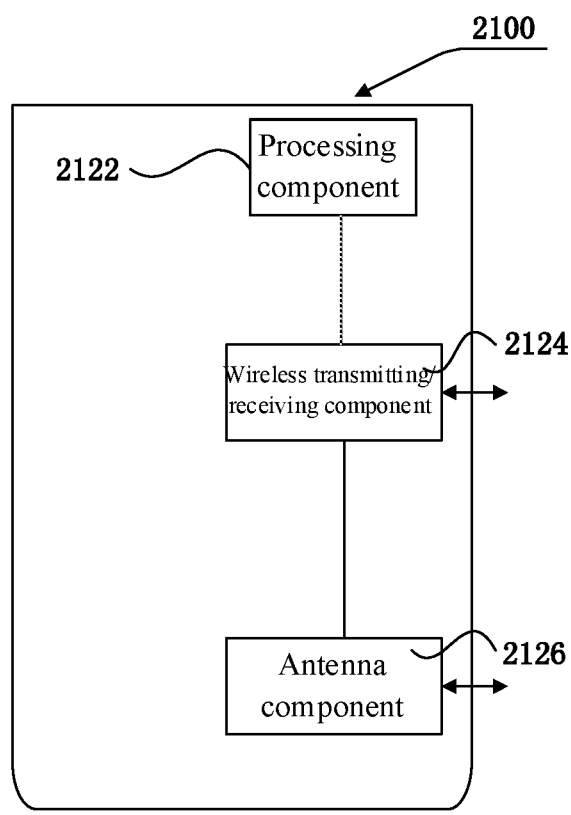
FIG. 21 is a schematic structural diagram illustrating a base station according to an example of the present disclosure.

As shown in FIG. 21, FIG. 21 is a schematic structural diagram illustrating a base station 2100 according to an example of the present disclosure. The base station may be applied to a 5G NR network. Referring to FIG. 21, the base station 2100 includes a processing component 2122, a wireless transmitting/receiving component 2124, an antenna component 2126 and a signal processing portion specific to a wireless interface. The processing component 2122 may further include one or more processors.

One of the processors in the processing component 2122 may be configured to:

determine sidelink resource configuration information, where the sidelink resource configuration information is used to instruct user equipment to determine a target sidelink resource according to quality of service (QoS) information of to-be-transmitted sidelink data; and broadcast the sidelink resource configuration information to the user equipment in a serving cell, so that the user equipment determines a target sidelink resource for conveying the to-be-transmitted sidelink data according to QoS information of the to-be-transmitted sidelink data and the sidelink resource configuration information. In the examples, there is further provided a non-transitory computer readable storage medium with computer instructions stored thereon, the computer instructions may be executable by the processing component 2122 in the base station 2100 to implement the method for determining sidelink resource according to FIG. 9 or FIG. 10. For example, the non-transitory computer-readable storage medium may be ROM, random access memory (RAM), CD-ROM, magnetic tape, floppy disk, optical data storage device, etc.

Those skilled in the art will easily think of other embodiments of the present disclosure after considering the specification and practicing the disclosure disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

What is claimed is:

1. A method of determining sidelink resource performed by user equipment comprising:
   determining sidelink resource configuration information, wherein the sidelink resource configuration information is used to instruct the user equipment to determine a target sidelink resource according to quality of service (QoS) information of a to-be-transmitted sidelink data, and the sidelink resource configuration information comprises at least one of a correspondence between a preset resource pool and first preset QoS information, a correspondence between second preset QoS information and a second resource determination mode, or a correspondence between third preset QoS information, and the second resource determination mode and a preset radio access type;
   determining a target resource determination mode according to the QoS information of the to-be-transmitted sidelink data and the sidelink resource configuration information, wherein the target resource determination mode is a first resource determination mode or the second resource determination mode, the first resource determination mode involves determining the target sidelink resource from the preset resource pool, and the second resource determination mode involves requesting a network to dynamically schedule sidelink resources; and
   determining the target sidelink resource for conveying the to-be-transmitted sidelink data in the target resource determination mode, so that the user equipment conveys the to-be-transmitted sidelink data via the determined target sidelink resource,
   wherein the sidelink resource configuration information comprises the correspondence between the second preset QoS information and the second resource determination mode; and
   determining the target resource determination mode according to the QoS information of the to-be-transmitted sidelink data and the sidelink resource configuration information, comprises;
   determining that the second preset QoS information comprises the QoS information of the to-be-transmitted sidelink data, and determining the second resource determination mode as the target resource determination mode, and
   determining the target sidelink resources for conveying the to-be-transmitted sidelink data in the target resource determination mode base on;
   determining a current connection state of the user equipment as an idle state, requesting a base station to establish a network connection; or
   determining a current connection state of the user equipment as a connected slate, sending sidelink resource request information to the base station;
   wherein the sidelink resource request information is used for requesting the base station to dynamically schedule sidelink resources for the user equipment.

2. The method according to claim 1, wherein determining the sidelink resource configuration information comprises:
   acquiring the sidelink resource configuration information broadcast by the base station.

3. The method according to claim 1, wherein
   the sidelink resource configuration information comprises: the correspondence between the preset resource pool and the first preset QoS information; and
   determining the target resource determination mode according to the QoS information of the to-be-transmitted sidelink data and the sidelink resource configuration information based on:
   determining that the first preset QoS information comprises the QoS information of the to-be-transmitted sidelink data, and determining the first resource determination mode as the target resource determination mode.

4. The method according to claim 3, wherein determining the target resource determination mode according to the QoS information of the to-be-transmitted sidelink data and the sidelink resource configuration information, comprises:
   determining that the first preset QoS information does not comprise the QoS information of the to-be-transmitted sidelink data, and determining the second resource determination mode as the target resource determination mode.

5. The method according to claim 4, wherein
   the sidelink resource configuration information further comprises: first preset indication information for informing the user equipment of acquiring the target sidelink resource in the second resource determination mode; and
   determining the second resource determination mode as the target resource determination mode, comprises:
   determining the second resource determination mode as the target resource determination mode according to the first preset indication information.

6. The method according to claim 3, wherein
   determining the target sidelink resource for conveying the to-be-transmitted sidelink data in the target resource determination mode, comprises:
   determining the target sidelink resource from a target preset resource pool corresponding to the QoS information of the to-be-transmitted sidelink data.

7. The method according to claim 1, wherein
   the sidelink resource configuration information comprises: the correspondence between the third preset QoS information, and the second resource determination mode and the preset radio access type; and
   determining the target resource determination mode according to the QoS information of the to-be-transmitted sidelink data and the sidelink resource configuration information based on:
  determining that the third preset QoS information comprises the QoS information of the to-be-transmitted sidelink data;
  determining that the user equipment supports a target radio access technology type corresponding to the QoS information of the to-be-transmitted sidelink data; and
  determining the second resource determination mode as the target resource determination mode.

8. The method according to claim 7, wherein
the preset radio access technology type comprises at least one of: NR sidelink access technology or Long Term Evolution (LTE) sidelink access technology.

9. The method according to claim 1, wherein
the QoS information comprises: sidelink data package priority indication information, or channel quality indication information.

10. The method according to claim 1, wherein before determining the target resource determination mode according to the QoS information of the to-be-transmitted sidelink data and the sidelink resource configuration information, the method further comprises:
  sending sidelink assistance information to the base station, so that the base station schedules sidelink resources for the user equipment by referring to the sidelink assistance information.

11. A non-transitory computer readable storage medium with computer instructions stored thereon, wherein when the computer instructions are executed by a processor, the method according to claim 1 is implemented.

12. A communication system implementing the method of claim 1, comprising the user equipment and a base station, wherein the base station is configured to:
  determine the sidelink resource configuration information; and
  broadcast the sidelink resource configuration information to the user equipment in a serving cell to facilitate the user equipment determining the target sidelink resource for conveying the to-be-transmitted sidelink data according to the QoS information of the to-be-transmitted sidelink data and the sidelink resource configuration information, thereby balancing a relationship between resource utilization and signaling overhead.

13. A method of determining sidelink resource performed by a base station, comprising:
  determining sidelink resource configuration information, wherein the sidelink resource configuration information is used to instruct user equipment to determine a target resource determination mode according to quality of service (QoS) information of a to-be-transmitted sidelink data, wherein the target resource determination mode is a first resource determination mode or a second resource determination mode, the first resource determination mode involves determining a target sidelink resource from a preset resource pool, and a second resource determination mode involves requesting a network to dynamically schedule sidelink resources, and wherein the sidelink resource configuration information comprises at least one of a correspondence between a preset resource pool and first preset QoS information, a correspondence between second preset QoS information and the second resource determination mode, or a correspondence between third preset QoS information, and the second resource determination mode and a preset radio access type; and
  broadcasting the sidelink resource configuration information to the user equipment in a serving cell, so that the user equipment determines that the sidelink resource configuration information comprises the correspondence between the second preset QoS information and the second resource determination mode, determines that the second preset QoS information comprises the QoS information of the to-be-transmitted sidelink data, determines the second resource determination mode as the target resource determination mode, and determines the target sidelink resources based on the target resource determination mode.

14. The method according to claim 13, further comprising:
  receiving sidelink assistance information sent by the user equipment; and
  determining a resource scheduling mode for the user equipment with reference to the sidelink assistance information, so that the base station schedules sidelink resources for the user equipment based on the determined resource scheduling mode.

15. A non-transitory computer readable storage medium with computer instructions stored thereon, wherein when the computer instructions are executed by a processor, the method according to claim 13 is implemented.

16. A base station implementing the method of claim 13, comprising:
  a processor; and
  memory storing instructions executable by the processor, wherein the processor is configured to perform steps of the method.

17. User equipment, comprising:
  a processor; and
  memory storing instructions executable by the processor, wherein the processor is configured to:
    determine sidelink resource configuration information, wherein the sidelink resource configuration information is used to instruct the user equipment to determine a target sidelink resource according to quality of service (QoS) information of a to-be-transmitted sidelink data, and the sidelink resource configuration information comprises at least one of a correspondence between a preset resource pool and first preset QoS information, a correspondence between second preset QoS information and a second resource determination mode, or a correspondence between third preset QoS information, and the second resource determination mode and a preset radio access type;
    determine a target resource determination mode according to the QoS information of the to-be-transmitted sidelink data and the sidelink resource configuration information, wherein the target resource determination mode is a first resource determination mode or the second resource determination mode, the first resource determination mode involves determining the target sidelink resource from the preset resource pool, and the second resource determination mode involves requesting a network to dynamically schedule sidelink resource; and
    determine the target sidelink resource for conveying the to-be-transmitted sidelink data in the target resource determination mode, so that the user equipment conveys the to-be-transmitted sidelink data via the determined target sidelink resource, wherein the sidelink resource configuration information comprises the correspondence between the second preset QoS information and the second resource determination mode; and determining the target resource determination mode according to the QoS information of the to-be-transmitted sidelink data and the sidelink resource configuration information based on:

determining that the second preset QoS information comprises the QoS information of the to-be-transmitted sidelink data, and determining the second resource determination mode as the target resource determination mode; and determining the target sidelink resource for conveying the to-be transmitted sidelink data in the target resource determination mode based on:
- determining a current connection state of the user equipment as an idle state, and requesting a base station to establish a network connection; or
- determining a current connection state of the user equipment as a connected state, and sending sidelink resource request information to the base station;
- wherein the sidelink resource request information is used for requesting the base station to dynamically schedule sidelink resources for the user equipment.

* * * * *